United States Patent
McCann et al.

(10) Patent No.: US 8,701,046 B2
(45) Date of Patent: Apr. 15, 2014

(54) AGGREGATE AND HIERARCHICAL DISPLAY OF GROUPED ITEMS SPANNING MULTIPLE STORAGE LOCATIONS

(75) Inventors: Robert Emmett McCann, Redmond, WA (US); Michael Affronti, Seattle, WA (US); Andrew Brauninger, Redmond, WA (US); James Edelen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 12/147,611

(22) Filed: Jun. 27, 2008

(65) Prior Publication Data

US 2009/0327972 A1 Dec. 31, 2009

(51) Int. Cl.
*G06F 3/14* (2006.01)

(52) U.S. Cl.
USPC .............. 715/853; 715/752; 725/53; 707/3; 709/206

(58) Field of Classification Search
USPC ............. 715/200–277, 700–867; 345/30–111
See application file for complete search history.

(56) References Cited

U.S. PATENT DOCUMENTS

| | | | |
|---|---|---|---|
| 6,396,513 B1 * | 5/2002 | Helfman et al. | 715/752 |
| 6,745,197 B2 | 6/2004 | McDonald | |
| 7,130,885 B2 | 10/2006 | Chandra et al. | |
| 7,194,516 B2 | 3/2007 | Giacobbe et al. | |
| 7,305,402 B2 | 12/2007 | Hind et al. | |
| 2003/0101065 A1 | 5/2003 | Rohall et al. | |
| 2004/0073616 A1 * | 4/2004 | Fellenstein et al. | 709/206 |
| 2005/0004989 A1 * | 1/2005 | Satterfield et al. | 709/206 |
| 2005/0004990 A1 * | 1/2005 | Durazo et al. | 709/206 |
| 2005/0138552 A1 | 6/2005 | Venolia | |
| 2005/0222985 A1 * | 10/2005 | Buchheit et al. | 707/3 |
| 2006/0117273 A1 * | 6/2006 | Smith et al. | 715/853 |
| 2006/0173961 A1 | 8/2006 | Turski et al. | |
| 2006/0218233 A1 | 9/2006 | Greve et al. | |
| 2006/0235933 A1 | 10/2006 | Baluja et al. | |
| 2010/0115559 A1 * | 5/2010 | Ellis | 725/53 |

OTHER PUBLICATIONS

"About Message Store Providers", msdn, Feb. 21, 2008, pp. 1-2.
Rohall, et al., "Email Visualizations to Aid Communications", Presented at IEEE Symposium on Information Visualization (InfoVis) 2001, Oct. 22-23, 2001, 4 pages.

* cited by examiner

*Primary Examiner* — Ruay Ho
(74) *Attorney, Agent, or Firm* — Louise Bowman; Leonard Smith; Micky Minhas

(57) ABSTRACT

Techniques for the aggregate and hierarchical display of grouped items spanning multiple storage locations are described. Some techniques may aggregate items in response to user input identifying a scope for item retrieval. The user input may identify a scope such as selection of a local storage location or a search query for retrieving items. The aggregated items may span multiple storage locations and include items within the identified scope and related items outside the identified scope. A group of aggregated items are presented in a hierarchical display within a user interface. The hierarchical display may visually differentiate items inside and outside of the identified scope, and may identify parent-child relationship between related items. An aggregate header for the group of aggregated items may be displayed indicating total items in the group and a status for items in the group within the identified scope. Other embodiments are described and claimed.

19 Claims, 6 Drawing Sheets

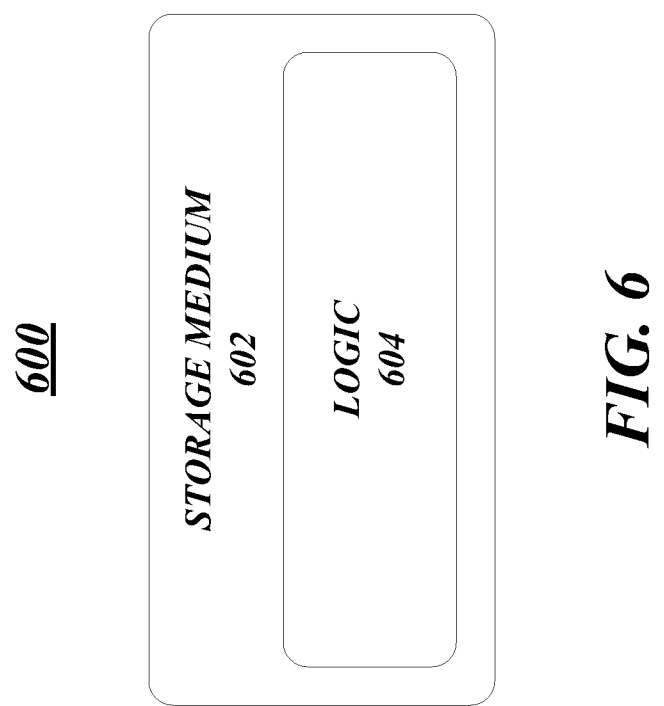

AGGREGATE AND HIERARCHICAL DISPLAY OF GROUPED ITEMS SPANNING MULTIPLE STORAGE LOCATIONS

BACKGROUND

Electronic mail (E-mail) applications provide users with the ability to store messages in logical groups within the interface. E-mail applications also may allow users to group stored messages into logical "conversations." Each conversation is a group of related messages including a root message and replies to the root message or to one another. When arranged by conversation, messages are displayed in a user interface of the e-mail application as a list of conversations grouped by message subject or thread. The conversations may be sorted by date, and the messages within each conversation may be sorted based on who replied to whom.

Some e-mail applications may limit the display of conversation items to the current view such that messages are not grouped together as a single conversation. Other e-mail applications may aggregate information in a user mailbox regardless of the message location relative to a user view. Consequently, improvements to item management and display techniques are needed to solve these and other problems and to enhance the experience of users in various usage scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are directed to techniques for item aggregation and display. Some embodiments are directed to aggregating items in response to receiving user input identifying a scope for item retrieval. The user input may identify a scope such as the selection of a local storage location or a search query for retrieving items, for example. The aggregated items may include items within the identified scope and related items outside of the identified scope. A group of aggregated items may be presented in a hierarchical display within a user interface. The aggregated items may comprise e-mail items such as e-mail messages and attachments, for example, as well as other types of grouped items in accordance with the described embodiments.

Some embodiments are particularly directed to the aggregation and display of e-mail messages. In one embodiment, for example, user input may be received for identifying a scope for retrieving e-mail messages and arranging e-mail messages by conversation. The scope may be a selected folder within the user interface of the e-mail application or a search query for retrieving e-mail messages within the e-mail application, for example. The e-mail messages within the identified scope may be aggregated with related e-mail messages outside of the identified scope. A conversation comprising a hierarchical display of the aggregated e-mail messages may be presented which identifies parent-child relationships between related e-mail messages and visually differentiates e-mail messages outside of the identified scope from e-mail messages within the identified scope. An aggregate conversation header for the conversation may be provided which indicates a total number of e-mail messages in the conversation and a number of unread e-mail messages in the conversation that are within the identified scope. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of an article.

DETAILED DESCRIPTION

Figure 1:
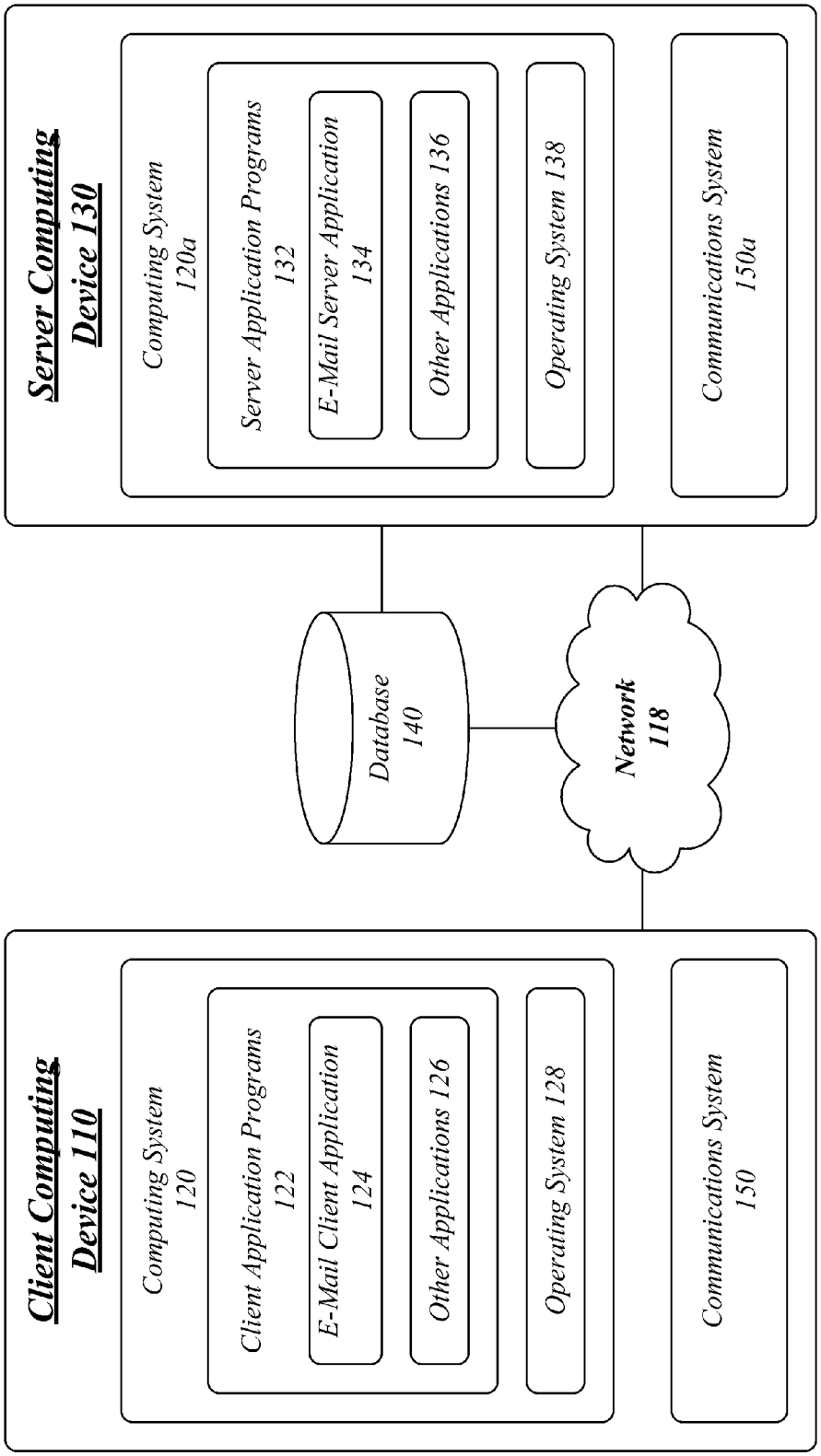
FIG. 1 illustrates an embodiment of an operating environment.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be directed to item aggregation and display techniques that may be implemented by an e-mail application. In general, an e-mail application allows users to compose, send, and receive messages over electronic communication systems. In some embodiments, the described techniques may be implemented by one or more elements of a client/server e-mail messaging system. In such embodiments, the server may support a variety of messaging clients, accept requests and data from clients, process the requests, store the data, and return the processing results to the clients. Accordingly, one or more of the item aggregation and display techniques may be implemented as features within client-based e-mail applications, server-based e-mail applications including a web-based e-mail applications providing access to e-mail services via a web browser, and/or by other types of applications, programs, or services that interact with e-mail.

In some embodiments, one or more of the item aggregation and display techniques can be implemented within an e-mail client application or software program such as MICROSOFT OFFICE OUTLOOK® application software from Microsoft Corporation, Redmond, Wash. In such embodiments, the described techniques may be performed by the e-mail client application in either an online or offline mode. In an offline mode, the e-mail client application may perform one or more item aggregation and display techniques on locally stored or cached e-mail messages. It can be appreciated that the described techniques may be implemented by any type of e-mail client in accordance with the described embodiments including, without limitation, Messaging Application Programming Interface (MAPI) clients, Hypertext Transfer Protocol (HTTP) clients, Post Office Protocol 3 (POP3) clients, Internet Message Access Protocol (IMAP or IMAP4) clients, Network News Transfer Protocol (NNTP) clients, webmail clients, and so forth.

Alternatively or additionally, one or more item aggregation and display techniques may be implemented as features within a server-based e-mail application or software program such as MICROSOFT EXCHANGE SERVER® from Microsoft Corporation, Redmond, Wash. The server may provide e-mail, calendaring, contacts and tasks functionality and support for mobile and web-based access to information, as well as data storage. The server may comprise or communicate with a message store for storing items including e-mail messages and other data in mailboxes and folders and may provide an interface for communicating with various e-mail clients and allowing access to the message store. The server also may comprise or communicate with a directory containing information about the users of the system and configuration information which may be used by a message transfer subsystem to perform various routing and transfer operations for e-mail messages intended for recipients on the server, another server in the same organization, and/or for recipients on the Internet or other messaging systems.

In some embodiments, the server may support various Web services including web access, mobile access, and synchronization functionality, Internet Information Services (IIS) and Internet Server Application Programming Interface (ISAPI) applications providing SMTP, NNTP, IMAP4, and POP3 services to allow Internet users to access to messaging data over a variety of Internet access protocols and HTTP-based protocols including remote procedure call (RPC) over HTTP communication. In some implementations, data may be formatted as compressed Wireless Binary XML (WbXML) data to make efficient use of bandwidth for mobile clients. In addition to standard Internet protocols, the server also may support communication over proprietary or non-standard protocols when used by a company or other organization.

The e-mail application may provide users with the ability to store messages in logical folders within the interface similar to that provided by many file systems. It can be appreciated that the term folder may refer to any collection of items however stored and/or represented in a user interface. While some operating systems or applications may not use the term folder when referring to a collection of items, such scenarios are intended to be covered by embodiments that describe and illustrate folders.

The e-mail application also may allow users to group stored messages into logical conversations. Each conversation may comprise a group of related messages including, for example, a root message and replies to the root message or to one another. When a user selects to arrange messages by conversation, the messages are displayed in a user interface of the e-mail application as a list of conversations which may be grouped by message subject or thread. The thread may represent an exchange of messages pertaining to a particular topic grouped visually in a hierarchy. The conversations may be sorted by date, and the messages within each conversation may be sorted based on who replied to whom.

In some cases, the messages of a conversation may be stored across multiple folders. For example, users may manually organize messages into various folders. Users also may set one or more filtering rules for automatically separating e-mail messages into certain folders based on sender, subject, or other criteria. In addition, a reply message sent by a user may be stored within the sent items folder of the user.

Arranging messages as a conversation across multiple storage locations provides advantageous usage scenarios including, for example, allowing a user to view a message in context with one or more messages sent by the user so that the user may read and comprehend the chronology and context of exchanged messages, allowing a user view a new message in the context of previous messages in the same conversation that have been filed to different folders, and allowing the user to view filed messages and newer, unfiled messages that are part of the same conversation so that the user has a complete and accurate representation of an ongoing conversation.

When displaying messages grouped according to conversation, an aggregate conversation header may be provided that rolls up the data contained in the messages of each conversation. The aggregate header may list all the message authors/senders of a conversation, a total count of messages in the conversation, and an unread state representing the combined read/unread state of all messages in the conversation.

Various item aggregation and display techniques are provided. Some techniques are directed to aggregating items in response to receiving user input identifying a scope for item retrieval. The user input may identify a scope such as the selection of a local storage location or a search query for retrieving items, for example. The aggregated items may include items within the identified scope and related items outside of the identified scope. A group of aggregated items may be presented in a hierarchical display within a user interface. The aggregated items may comprise e-mail items such as e-mail messages and attachments, for example, as well as other types of grouped items in accordance with the described embodiments.

Some embodiments are particularly directed to the aggregation and display of e-mail messages. In one embodiment, for example, user input may be received for identifying a scope for retrieving e-mail messages and arranging e-mail messages by conversation. The scope may be a selected folder within the user interface of the e-mail application or a search query for retrieving e-mail messages within the e-mail application, for example. The e-mail messages within the identified scope may be aggregated with related e-mail messages outside of the identified scope. A conversation comprising a hierarchical display of the aggregated e-mail messages may be presented which identifies parent-child relationships between related e-mail messages and visually differentiates e-mail messages outside of the identified scope from e-mail messages within the identified scope. An aggregate conversation header for the conversation may be provided which indicates a total number of e-mail messages in the conversation and a number of unread e-mail messages in the conversation that are within the identified scope.

FIG. 1 illustrates a block diagram for an operating environment 100 suitable for practicing the various embodiments. The operating environment 100 may comprise elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the operating environment 100 may comprise, among other elements, a client computing device 110 and a server computing device 130. The computing devices 110, 130 may be implemented utilizing any suitable electronic device having computing capabilities and communications capabilities. Examples for computing devices 110, 130 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the operating environment 100 as shown in FIG. 1 has a limited number of nodes in a certain topology, it may be appreciated that the operating environment 100 may include more or less nodes in alternate topologies as desired for a given implementation.

The computing devices 110, 130 may be communicatively coupled via a network 118 and appropriate wireless or wired communications media. The computing devices 110, 130 may coordinate operations between each other. The coordination may involve the uni-directional or bi-directional exchange of information. For instance, the computing devices 110, 130 may communicate information over the network 118. The network 118 may comprise a packet-switched network, a circuit-switched network, or a combination of both. The information can be implemented as data messages sent across various network interfaces. Exemplary network interfaces include parallel interfaces, serial interfaces, and bus interfaces.

The computing devices 110, 130 may implement respective computing systems 120, 120a. The computing systems 120, 120a may include various computing elements, such as one or more processors, co-processors, memory units, chipsets, controllers, peripherals, interfaces, oscillators, timing devices, video cards, audio cards, multimedia input/output (I/O) components, and so forth. The computing systems 120, 120a may implement, among other elements, respective client application programs 122 and server application programs 132. In the example illustrated in FIG. 1, the client application programs 122 may comprise an e-mail client application 124 and other applications 126, and the server application programs 132 may comprise an e-mail server application 134 and other applications 136. In various implementations, the e-mail client application 124 and/or e-mail server application 134 may perform one or more item aggregation and display techniques in accordance with the described embodiments.

The applications 126 may comprise one or more types of application programs supporting operation of the client computing device 110. Exemplary application programs may include, without limitation, a web browser application, telephone application (e.g., cellular, VoIP, PTT), networking application, messaging application (e.g., IM, SMS, MMS), calendar application, contacts application, tasks application, word processing application, spreadsheet application, database application, media application (e.g., video player, audio player, multimedia player, digital camera, video camera, media management), location based services (LBS) application, gaming application, and so forth.

The applications 136 may comprise one or more types of application programs supporting operation of the server computing device 130. In various implementations, the applications 136 may include server application programs supporting operation of the server computing device 130 as an e-mail server, a web server, and/or file server in accordance with the described embodiments. In some cases, one or more of the applications 136 may comprise a network, server or web-based version of one or more of the applications 126. In such cases, the applications 126, 136 may operate separately, such as when the client computing device 110 is offline, or may interoperate when the client computing device 110 is online and connected to the server computing device 130 via the network 118.

The computing systems 120, 120a also may comprise respective operating systems 128, 138 suitable for controlling the operation of the client computing device 110 and the server computing device 130. In some embodiments, the operating systems 128, 138 may comprise respective client and server versions of an operating system such as a MICROSOFT WINDOWS® operating system from Microsoft Corporation, Redmond, Wash. It can be appreciated that other suitable operating systems may be used for the client computing device 110 and/or the server computing device 130.

The computing devices 110, 130 may comprise or communicate with a data store for item storage such as e-mail messages and other data in mailboxes and folders. With reference to FIG. 1, the data store may be implemented by a database 140. In such implementations, the server computing device 130 may provide the client computing device 110 with access to the database 140 when connected via the network 118. Alternatively or additionally, the client computing device 110 may directly access the database 140 via the network 118.

While shown as being separate elements for purposes of illustration, it can be appreciated that in some embodiments, the database 140 may form part of the client computing device 110 and/or the server computing device 130. It also can be appreciated that the data store can reside on the client computing device 110, the server computing device 130, and/or the database 140 and that, in some embodiments, the client computing device 110, the server computing device 130, and/or the database 140 may store respective data stores which may be synchronized with each other.

In addition to respective computing systems 120, 120a, the computing devices 110, 130 may implement respective communications system 150, 150a. The communications systems 150, 150a may include various communications elements, such as a transmitter, receiver, transceiver, radio, network interface, baseband processor, antenna, amplifiers, filters, and so forth. In one embodiment, for example, the computing devices 110, 130 may be implemented using a computing and communications architecture as described with reference to FIG. 2.

Figure 2:
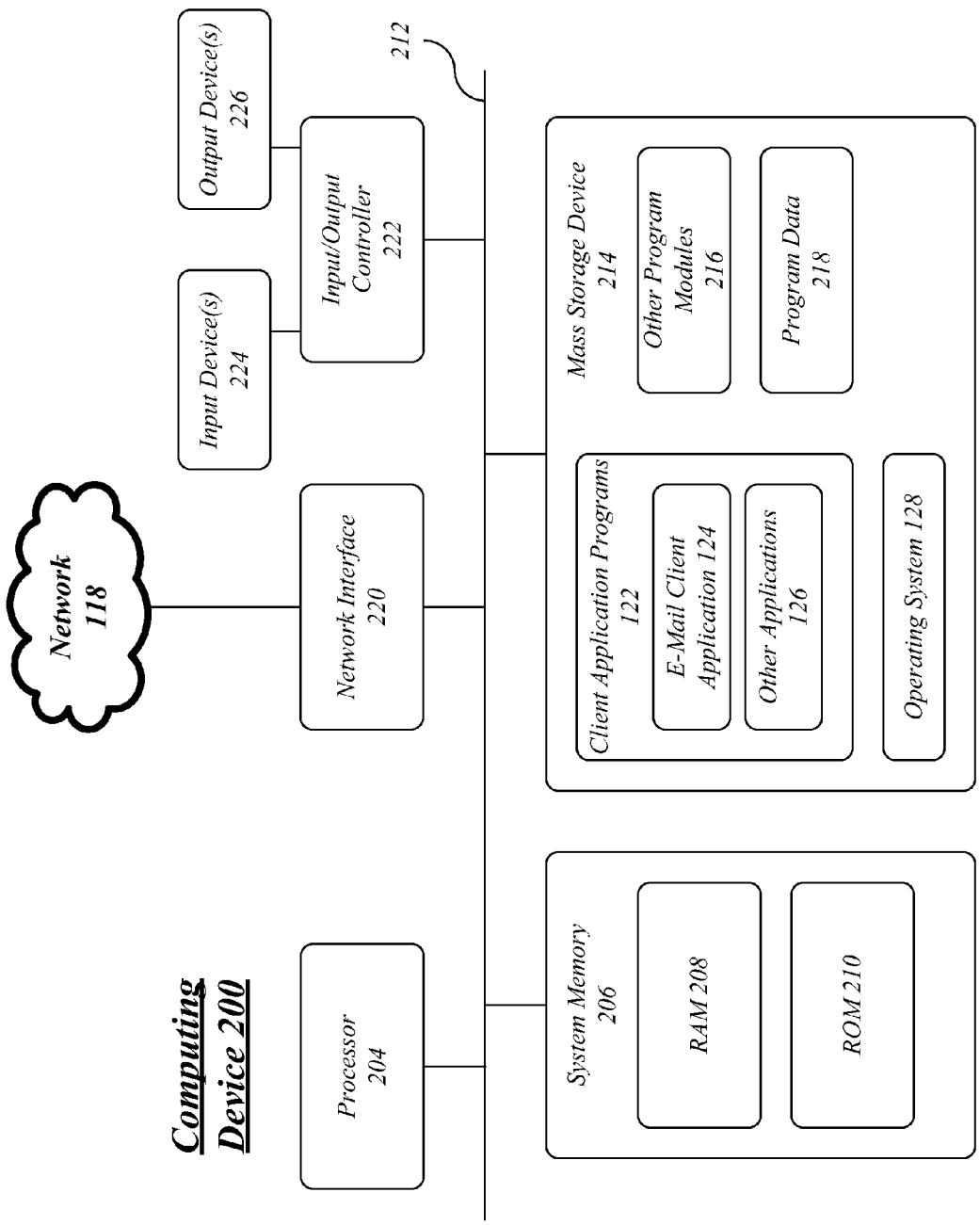
FIG. 2 illustrates an embodiment of a computing device.

FIG. 2 provides an illustrative architecture for a computing device 200 suitable for practicing the various embodiments. The computing device 200 may be representative of, for example, the client computing device 110 and/or the server computing device 130. As shown, the computing device 200 illustrates a conventional computing architecture for a personal or server computer, including a processing system comprising a processor 204 and a system memory 206. The system memory 206 may include, among other types of memory, a random access memory (RAM) 208 and a read-only memory (ROM) 210. An input/output (I/O) system, such as a basic I/O system (BIOS), may implement routines to assist in transferring information between elements within the computing device 200, such as during startup operations, using logic stored in the ROM 210. A system bus 212 communicatively couples all of the elements of the computing device 200 to facilitate information transfer and data processing operations.

The computing device 200 further includes a mass storage device 214 for storing an operating system, such as the operating system 128, as well as other program modules 216 and program data 218. The mass storage device 214 also may store various application programs, as described in greater detail below.

The mass storage device 214 is connected to the processor 204 through a mass storage controller (not shown) connected to the system bus 212. The mass storage device 214, and its associated computer-readable media, provides non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computing device 200. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments, the computing device 200 may operate in a networked environment using logical connections to remote computers through a network 118 which, in some implementations, may be a Transmission Control Protocol (TCP) and Internet Protocol (IP) network, such as the Internet. The computing device 200 may connect to the network 118 through a network interface 220 (e.g., a wired or wireless network interface) connected to the system bus 212. It can be appreciated that the network 118 may comprise any type of network in accordance with the described embodiments including, without limitation, a wide area network (WAN), a local area network (LAN), and/or a cellular telephone network and that the network interface 220 may support various transport layers such as GPRS, CDMA 1×RTT, IEEE 802.11, Bluetooth® (PAN), and others for connecting to a variety of networks and/or remote computer systems.

The computing device 200 may include an I/O controller 222 for receiving and processing input from a number of input devices 224. A user may enter commands and information into the computing device 200 through various input devices 224 such as a keyboard and pointing device, such as a mouse, trackball or touch pad. Other examples of input devices 224 may include a microphone, joystick, game pad, satellite dish, scanner, or the like. The input devices 224 may be connected to the processor 204 through the I/O controller 222 that is coupled to the system bus 212, but may be connected by other interfaces and bus structures, such as a parallel port, game port or a universal serial bus (USB). The I/O controller 222 also may provide output to various output devices 224, such as a monitor or other type of display device that is connected via the I/O controller 222 to the system bus 212. In various implementations, the display device may present one or more user interfaces (UIs) to a user in accordance with the described embodiments. In addition to a display device, the I/O controller 222 may provide output to a printer, speakers, and other peripheral devices.

As mentioned above, a number of program modules and data files may be stored in the mass storage device 214 and RAM 208 of the computing device 200. In the example illustrated in FIG. 2, the mass storage device 214 and RAM 208 may store the operating system 128 as well as one or more client application programs 122 including the e-mail client application 124 and other applications 126. It can be appreciated that in some implementations, the mass storage device 214 and RAM 208 may store the operating system 138 as well as one or more server application programs 132 including the e-mail server application 134 and other applications 136.

According to various embodiments, the e-mail client application 124 and/or the e-mail server application 134 may implement one or more item aggregation and display techniques. In one embodiment, for example, the e-mail client application 124 and/or the e-mail server application 134 may be implemented as described with reference to FIG. 3.

Figure 3:
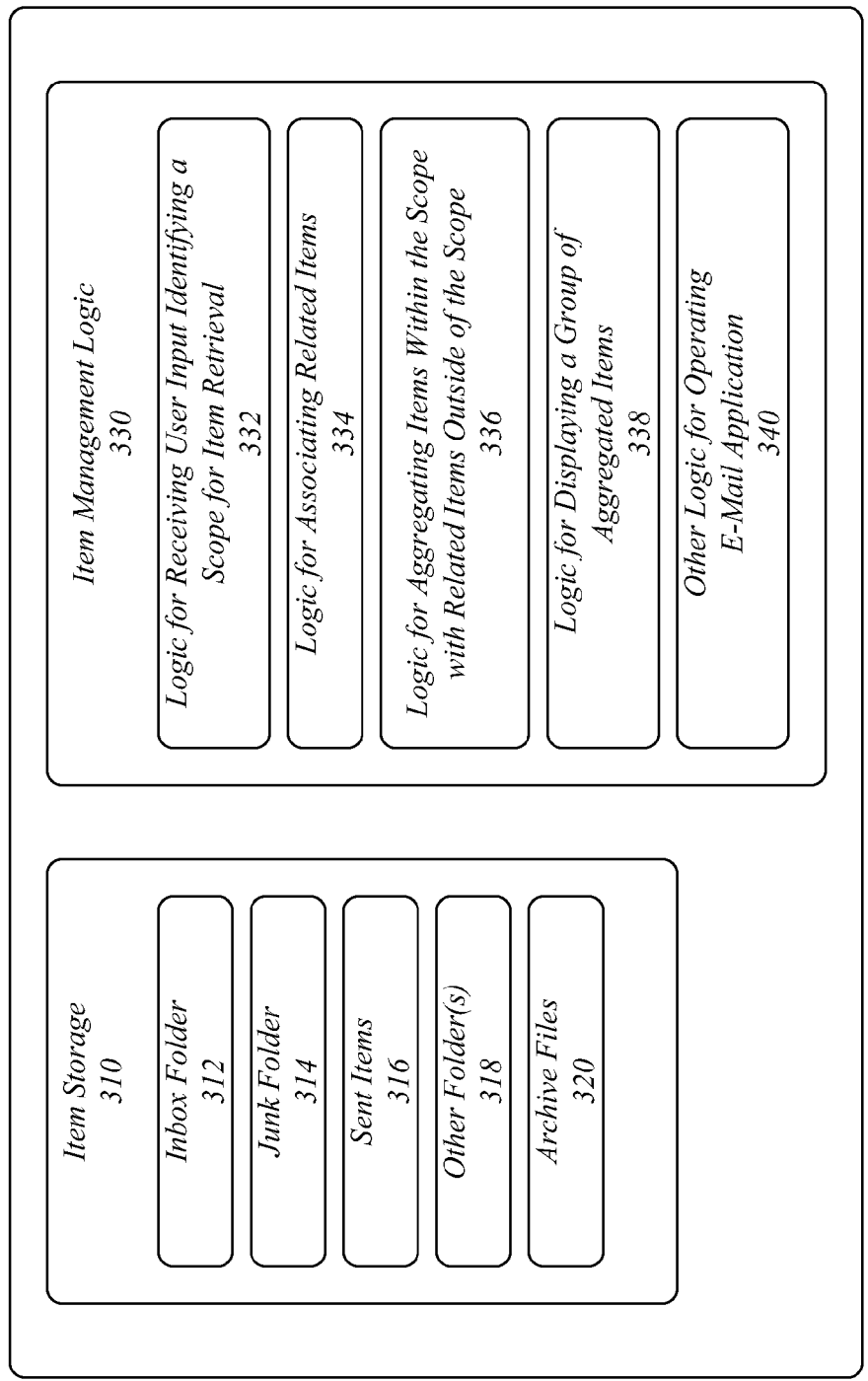
FIG. 3 illustrates an embodiment of an e-mail application.

FIG. 3 illustrates one embodiment of an e-mail application 300 suitable for practicing the various embodiments. With reference to FIGS. 1 and 2, in some implementations, the e-mail application 300 may operate as the e-mail client application 124 as one of the client application programs 122 that reside on the computing device 110. Alternatively or additionally, the e-mail application 300 may operate as the e-mail server application 134 as one of the server application programs 132 that reside on the computing device 130. Further, one or more parts of the e-mail application 300 may be distributed between the e-mail client application 124 and the e-mail server application 134. One or more parts of the e-mail application 300 also may be implemented by application programs in the RAM 208 of the computing device 200, on another remote computer, or in any other variation as would occur to one in the computer software art.

As shown, the e-mail application 300 may include item storage 310. While the item storage 310 is shown as part of the e-mail application 300 for purposes of illustration, and not limitation, it can be appreciated that the item storage 310 can reside in various locations in accordance with the described embodiments. For instance, the item storage 310 may reside on the client computing device 110, the server computing device 130, and/or the database 140. As one non-limiting example, the item storage 310 of the e-mail application 300 can reside within the program data 218 of the computing device 200, either in a database and/or in one or more files. As another non-limiting example, the item storage 310 can reside all or in part in a directory specified by the user in the file system of an operating system such as operating system 128 or operating system 138. As another non-limiting example, the item storage 310 can reside all or in part on the database 140 which may be accessed or hosted by the server computing device 130.

In the example illustrated in FIG. 3, the item storage 310 includes an inbox folder 312, a junk folder 314, a sent items folder 316, one or more other e-mail folders 318, and one or more archive files 320. It can be appreciated that the term folder or file may refer to any collection of items however stored and/or represented in a user interface. While some operating systems or applications may not use the term folder when referring to a collection of items, such scenarios are intended to be covered by embodiments that described and illustrate folders. It also can be appreciated that other folder variations and files may be implemented in accordance with the described embodiments.

The e-mail application 300 may provide the user with the ability to store items in certain logical folders such as the inbox folder 312, the junk folder 314, the sent items folder 316, and one or more other e-mail folders 318 such as a user-created folder for storing items associated with a certain sender or recipient, subject (e.g., project), content (e.g., text, attachment), or other criteria. The user may interface with the e-mail application 300 and manually organize items into various folders. The user also may set one or more filtering rules for automatically separating items into certain folders based on sender, recipient, subject, content, or other criteria. In addition, replies message sent by the user in response to other messages may be stored within the sent items folder 316. The users also may store older items in one or more archive files 320 which may be implemented as one or more Personal Storage Table extension (.pst) files on the local hard drive of the user and/or any other suitable archiving data structure.

The e-mail application 300 may allow the user to group stored messages into logical conversations. Each conversation may comprise a group of related items including, for example, a root message and replies to the root message or to one another. In some cases, the related items of a conversation may be stored across multiple storage locations such as across two or more of the inbox folder 312, junk folder 314, sent items folder 316, other e-mail folders 318, and archive files 320.

As shown, the e-mail application 300 may include item management logic 330 which may be responsible for carrying out some or all of the item aggregation and display techniques described herein. In the example illustrated in FIG. 3, the item management logic 330 includes logic for receiving user input identifying a scope for item retrieval 332, logic for associating related items 334, logic for aggregating items within the identified scope with related items outside of the identified scope 336, and logic for displaying a group of aggregated items 338.

The item management logic 300 also may comprise other logic for operating the e-mail application 340 which may support various other operations and capabilities. Exemplary operations and capabilities may include sending and receiving operations, storing and organizing operations, filtering operations, sorting operations, searching operations, previewing operations, capabilities for synchronization, capabilities for accessing messaging data including web access and mobile access, capabilities for detecting the online/offline state of users, capabilities for integrating the e-mail application 300 with calendar, contacts and tasks functionality, and/or any other features in accordance with the described embodiments.

In some implementations, the item management logic 330 may reside within the e-mail application 300 as part of the client application programs 122 on the client computing device 110 or as part of the server application programs 132 on the server computing device 130. It can be appreciated, however, that the item management logic 330 can alternatively or additionally be embodied as computer-executable instructions stored on one or more types of computer-readable storage media in a variety of locations in accordance with the described embodiments.

Although the example illustrated in FIG. 3 includes a particular set of logic, it can be appreciated that the item management logic 330 provides an exemplary implementation of the general functionality. It is to be understood that the sequence of logic does not necessarily have to be executed in the order presented unless otherwise indicated. In addition, while the item management logic 330 may be described as performing a certain sequence of steps, other sequences of steps may also be performed according to alternative embodiments. Moreover, some individual steps performed by the item management logic 330 may include multiple sub-steps that may be performed in various sequences as appropriate to the individual step. Furthermore, additional steps may be performed or some steps may be omitted by the item management logic 330 depending on the particular implementation.

Figure 4:
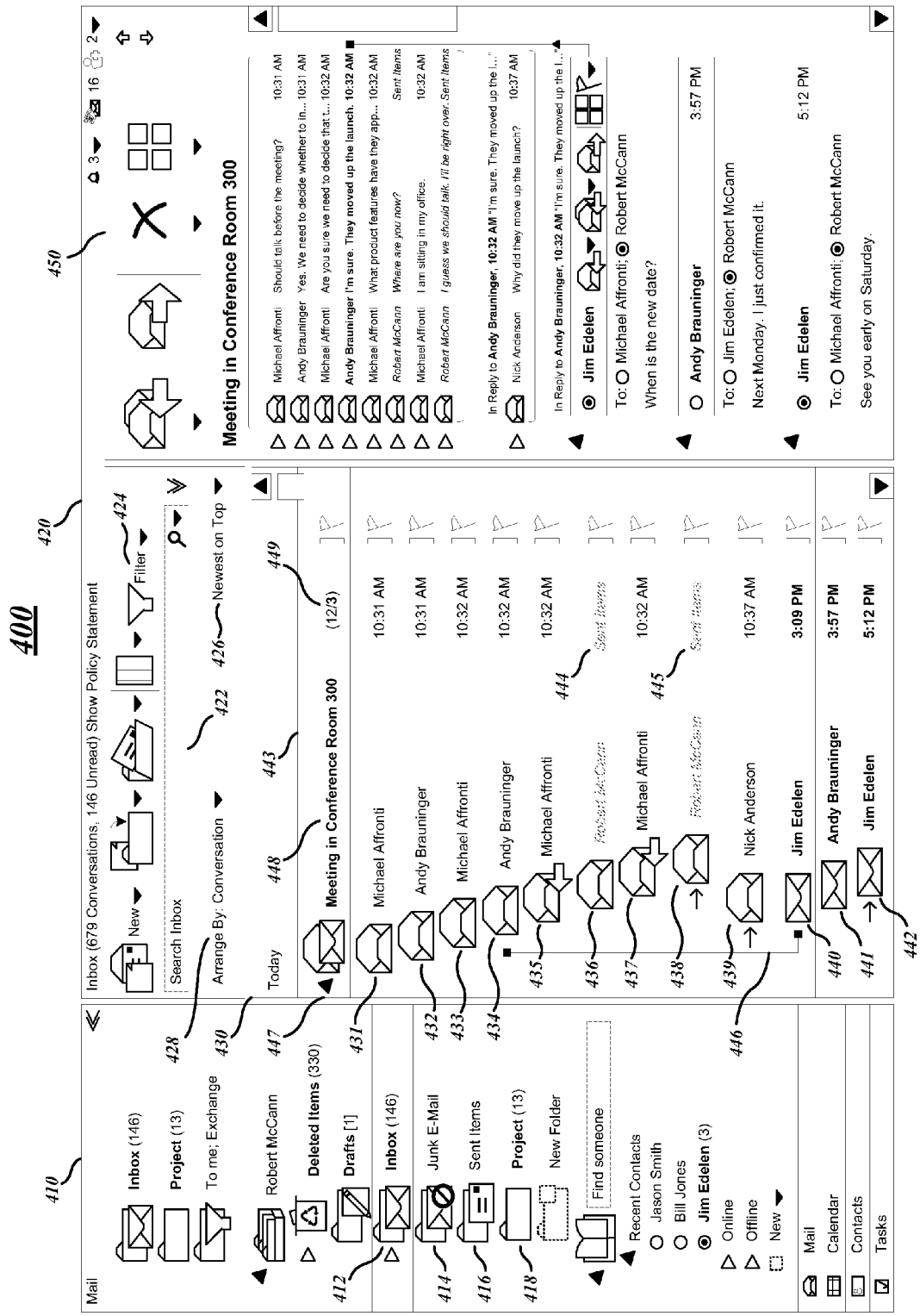
FIG. 4 illustrates an embodiment of a user interface.

FIG. 4 illustrates one embodiment of a UI 400 suitable for practicing the various embodiments. With reference to FIGS. 1-3, in some implementations, the UI 400 may be an interface of the e-mail application 300 operating as the e-mail client application 124 residing on the computing device 110. The UI 400 may be presented by a display device implemented as one of the output devices 226 of the computing device 200. It can be appreciated that the embodiments are not limited in this context and that interfaces other than the UI 400 may be used.

The UI 400 may comprise a folder list window 410 for allowing the user to view a list of available folders in the mailbox and to select one or more folders to view. As shown, the folder list window 410 may include an Inbox folder 412, a Junk E-mail folder 414, a Sent Items folder 416, a user-created Project folder 418, and other folders. It can be appreciated that, in some implementations, the Inbox folder 412, the Junk E-mail folder 414, the Sent Items folder 416, the user-created Project folder 418, and other folders may correspond to logical storage locations and that the physical storage locations for such items may reside within the e-mail application 300, as described above with reference to FIG. 3, as well as in any other location on the client computing device 110, the server computing device 130, and/or the database 140 in accordance with the described embodiments.

In this example, the Inbox folder 412 has been selected to be viewed, and the UI 400 includes a folder view window 420 corresponding to the selected folder. The folder view window 420 may allow the user to perform various operations for the selected folder. For example, the folder view window 420 may include a search box 422 for searching the selected folder, a filter menu 424 for setting one or more filtering rules, a sorting menu 426 for ordering messages within the selected folder, and an arrangement menu 428 for arranging the messages within the selected folder.

The folder view window 420 also comprises a list pane 430 for allowing the user to view a list of opened and unopened messages. It can be appreciated that messages within the selected folder may be arranged in various ways including by conversation, date, sender, recipient, subject, content, and other criteria. When a selected folder, such as the Inbox folder 412 or the Sent Items folder 416, is arranged by date for example, the list pane 430 may display all the messages that are stored in the selected folder based on the date and time associated with each message, such as by date and time received for the Inbox folder 412 or by date and time sent for the Sent Items folder 416. In some cases, the messages also may be grouped by date and sorted so that the newest messages are displayed from the top.

When a selected folder is arranged by conversation, the list pane 430 may display a list of conversations. Within the list pane 430, the conversations may be grouped by date and sorted so that the newest conversations are displayed from the top. In some cases, related items such as the root and reply messages of a conversation may span multiple logical or physical storage locations. According to various embodiments, the list pane 430 may present each conversation as a group of aggregated items comprising both in-scope items and out-of-scope items. The in-scope items may include, for example, one or more messages of the conversation stored within the selected folder, and the out-of-scope items may include one or more cross-folder messages of the conversation stored across one or more other folders. It can be appreciated that items can be scoped by a selected folder in view, search criteria, or other suitable ways in accordance with the described embodiments.

In the example illustrated in FIG. 4, the Inbox folder 412 has been selected for viewing and identifies the scope of item retrieval. The Inbox folder 412 also has been selected to be arranged by conversation for viewing in the list pane 430. As shown, the UI 400 may display a group of aggregated items in the list pane 430, which in this example, includes the related messages 431-442 of a conversation 443. The message 431 comprises a root message, and the messages 432-442 comprise replies to other messages of the conversation 433. In this example, the related messages 431-442 of the conversation 443 are stored across multiple storage locations including the Inbox folder 412 and the Sent Items folder 416. It can be appreciated that while only the conversation 443 is shown for purposes of illustration, the list pane 430 may include any number of other conversations.

According to various embodiments, items within the identified scope may be aggregated with related items outside of the identified scope and displayed as a group. Items that meet the identified scope may be considered local items. In some implementations, the in-scope items may comprise local items that are logically or physically stored in a local storage location and the out-of-scope items may comprise items that are logically or physically stored in one or more additional storage locations. In such implementations, the group includes aggregated items from multiple storage locations including the local storage location and the one or more additional storage locations. For instance, if the identified scope corresponds to a selected folder such as the Inbox folder 412, the in-scope items comprise the messages that are locally stored in the selected folder, and the out-of-scope items comprise cross-folder messages that are stored in one or more additional folders such as the Sent Items folder 416, the Project folder 418, or other folders. In the example illustrated in FIG. 4, the identified scope may correspond to the Inbox folder 412, and the conversation 443 comprises messages within the identified scope (messages 431-435, message 437, and messages 439-442) that are stored in the Inbox folder 412 and messages outside of the identified scope (message 436 and message 438) that are stored in the Sent Items folder 416.

In other implementations, the in-scope items or local items may comprise returned items that satisfy a search query, and the out-of-scope items may comprise items that are related to the returned items that satisfy the search query. In such implementations, the group includes items within the identified scope that satisfy the search query and items outside of the identified scope that are related to the items that satisfy the search query. For example, if the identified scope corresponds to a search query for retrieving e-mail messages, the in-scope items comprise the messages that satisfy the search query, and the out-of-scope items comprise the messages that are related to the messages that satisfy the search query.

As shown in FIG. 4, the conversation 443 comprises a group of aggregated items including messages which are within the identified scope and related messages which are outside of the identified scope. The list pane 430 displays both local items and cross-folder items and combines tightly scoped aggregate data with a broadly scoped list of items spanning multiple storage locations. When the conversation 443 is viewed, all messages across all of the folders that constitute the conversation 443 are aggregated and displayed in one view within the list pane 430. In some implementations, the user may act only on the in-scope items of a conversation by default. In other implementations, all of the items within the current scope and outside of the current scope which are visible in a conversation may be acted upon to allow the user to perform ongoing actions on ongoing conversations.

According to various embodiments, items outside of the identified scope may be visually differentiated from items within the identified scope. For example, local items and cross-folder items may are shown together in the list pane 430 yet easily distinguished from each other. By treating the in-scope and out-of-scope items differently within the list pane 430, the user is aware that cross-folder items are not logically or physically stored within the folder in view but is able to read and comprehend the context of a conversation since all messages are displayed regardless of folder location. Additionally, in some implementations, the user may interact with one or more local and cross-folder items displayed in the list pane 430.

In some implementations, the logical or physical storage locations for items that are outside of the identified scope may be provided. In the example illustrated in FIG. 4, a folder location 444 is provided for out-of-scope message 436, and a folder location 445 is provided for out-of-scope message 438. In contrast, the time received is provided for the in-scope items including messages 431-435, message 437, and messages 439-442.

Alternatively or additionally, items outside of the identified scope may have different text formatting than items within the identified scope. As shown in FIG. 4, for example, messages 431-435, message 437, and messages 439-442 which are within the current scope may be displayed in regular black text while message 436 and message 438 which are outside of the current scope may be distinguished and deemphasized by being displayed in italics and in a lighter color such as gray. It can be appreciated that other suitable techniques for distinguishing items may be employed in accordance with the described embodiments.

According to various embodiments, a group of aggregated items may be presented in a hierarchical display. As shown in FIG. 4, for example, the conversation 433 may be presented as a hierarchical display of the aggregated messages in the list pane 430. Both in-scope and out-of-scope items may be presented in the list pane 430 in a logical way that preserves the hierarchy of the conversation 443. Accordingly, the related messages that form the conversation 443 are displayed within the list pane 430 in a proper hierarchy regardless of logical or physical storage locations to show how each local and cross-folder item fits into the conversation hierarchy.

The hierarchical display presented in the list pane 430 may identify parent-child relationships between related items such as the root and reply messages of the conversation 443. A child message generally may comprise any message that replies to another message, and a parent message is a message to which a child message replied. In many cases, a child message may include the body and header of its parent message as well as other previous messages in the conversation thread.

Within the list pane 430, a child item may be indented from and with respect to its parent item to illustrate hierarchy. In the example illustrated in FIG. 4, the message 434 is a parent message of the message 435, the message 439, and the message 440. As shown, the message 435, the message 439, and the message 440 are similarly indented with respect message 434 and to each other to illustrate the hierarchy of the conversation 443. Alternatively or additionally, a child item may be graphically connected to its parent item. As shown, the list pane 430 may include a pipe connector 446 connecting the message 434 to the message 440 for illustrating their parent-child relationship in the conversation hierarchy. In some embodiments, messages may be listed in chronological order without indentation using only the pipe connector 446 to indicate hierarchy.

According to various embodiments, aggregate header information may be displayed for the group of aggregated items. As shown, the list pane 430 may display an aggregate conversation header 447 for the conversation 443. The aggregate conversation header 447 can be selectively expanded to view a list of the messages 431-442 contained within the conversation 443 and collapsed to roll up the messages 431-442 of the conversation 443 so that only the aggregate conversation header 447 is displayed. In some implementations, all items in the expanded list can be viewed and acted upon regardless of folder location.

In the example illustrated in FIG. 4, the aggregate conversation header 447 may include a conversation subject 448 (Meeting in Conference Room 300) and a conversation message count 449 reflecting a total number of messages in the conversation and a number of unread messages (12 total messages and 3 unread messages). It can be appreciated that the aggregate conversation header 447 also may include other types of information in accordance with the described embodiments.

In some implementations, the aggregate conversation header 447 reflects items within the current scope combined with a list of items that is cross-scope. In such implementations, the aggregate conversation header 447 may display aggregate data for items contained within the conversation 443 scoped to the current folder in view. For example, the conversation message count 449 may indicate the total number of items in the conversation 443 and the number of unread messages within the identified scope.

To avoid such discrepancies when displaying the number of unread messages, the conversation message count 449 of the aggregate conversation header 447 reflects the number of unread messages in the conversation 443 that are within the identified scope. For instance, when the conversation 443 is rolled up, the unread messages 440-442 of the conversation 443 will not be in view. The conversation message count 449 of the aggregate message header 447, however, will indicate that are twelve total messages and three unread items in the conversation 443. Thus, in some implementations, the list pane 430 scopes all aggregate data to the current user view such that only the status of items in the storage location (e.g., Inbox folder 412) being viewed are reflected in the aggregate conversation header 447. The status of items may include, for example, the read/unread status, the total number of messages in a conversation, categories, flags, and/or any other item status in accordance with the described embodiments. It can be appreciated that the aggregate conversation header 447 may be implemented in other ways in accordance with the described embodiments.

In the example illustrated in FIG. 4, the conversation 443 is broken across multiple folders and includes some messages which are logically stored in the Inbox folder 412 and some messages that are stored in the Sent Items folder 416. When the user examines the conversation 443 while viewing the Inbox folder 412 as shown in FIG. 4, the conversation 443 includes all related items which are within the current scope (e.g., Inbox folder 412) and are outside of the current scope (e.g., Sent Items folder 416). In this case, the aggregate conversation header 447 reflects the twelve total messages in the conversation 443 and the three unread messages corresponding only to the unread messages logically stored in the Inbox folder 412. If the user were to examine the same conversation 443 while viewing the Sent Items folder 416, the aggregate conversation header 447 would differently reflect the number of unread items of the conversation 443 that are stored in the Sent Items folder 416, which in this example is zero.

This provides the user with a view of the conversation 443 across all folders with a rollup of information specific to the choice of folder. The unread count reflected next to the folders in the folder list view window 410 is equal to the sum total of all the unread items indicated by the rolled up aggregate conversation header 447 and other conversation headers (not shown) in the list pane 430. By performing the calculation of unread items in this way, the number of unread messages will not change when the folder in view is sorted in different ways, such as by date.

In various embodiments, the UI 400 also may comprise a preview pane 450 in the folder view window 420. The preview pane 450 may allow the user to view a portion of messages without fully opening the unread messages. As shown in FIG. 4, the preview pane 450 includes collapsed previews of messages 431-439 and expanded previews of unread messages 440-442.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5:
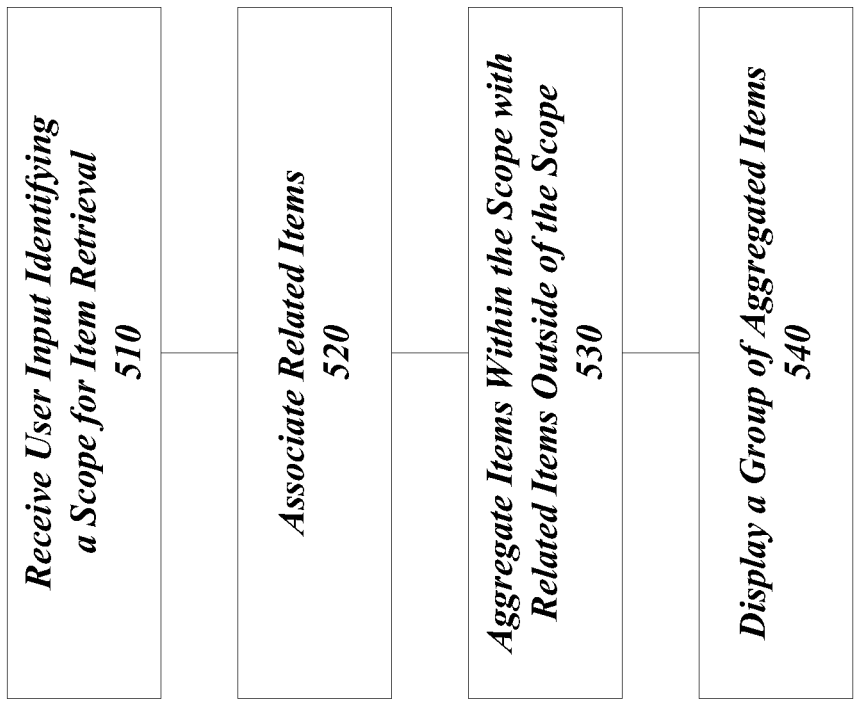
FIG. 5 illustrates an embodiment of a logic flow.

FIG. 5 illustrates one embodiment of a logic flow 500 suitable for practicing the various embodiments. The logic flow 500 may be representative of some or all of the operations executed by one or more embodiments described herein.

As shown, the logic flow 500 may comprise receiving user input identifying a scope for item retrieval (block 510). In some embodiments, the user input may identify a scope such as the selection of a local storage location. For example, the identified scope may comprise a selected folder within the user interface of an e-mail application. In other embodiments, the user input may identify a scope such as a search query for retrieving one or more items. For example, the identified scope may comprise a search query for retrieving e-mail messages within an e-mail application.

The logic flow 500 may comprise associating related items (block 520). In some embodiments, the related items may comprise messages of a conversation including, for example, a root message and replies to the root message or to one another. In some implementations, each item may comprise a key for uniquely identifying the item that can be used to associated related items. In the context of e-mail, each message may be associated with a unique message identifier (message ID). When a message is sent in reply to another message, the header of the reply message may include the message ID of the replied-to message for associating related messages.

The logic flow 500 may comprise aggregating items within the identified scope with related items outside of the identified scope (block 530). In various implementations, the aggregated items may span multiple storage locations and include items within the identified scope and related items outside of the identified scope. In some embodiments, the scope may comprise a local storage location, and the group may include aggregated items from multiple storage locations including the local storage location and one or more additional storage locations. For example, the identified scope may comprise a selected folder within the user interface of an e-mail application, and a conversation may include messages within the identified scope that are stored in the selected folder and messages outside of the identified scope that are stored in one or more additional folders of the e-mail application.

In some embodiments, the scope may comprise a search query for retrieving one or more items, and the group may include items within the identified scope that satisfy the search query and items outside of the identified scope that are related to the items that satisfy the search query. For example, the identified scope may comprise a search query for retrieving e-mail message within an e-mail application, and a conversation may include messages within the identified scope that satisfy the search query and messages outside of the identified scope that are related to the e-mail messages that satisfy the search query.

The logic flow 500 may comprise presenting a group of aggregated items in a hierarchical display within a user interface (block 540). In various implementations, the group of aggregated items can be expanded and collapsed within the user interface. When presented in the user interface, items outside of the identified scope may be visually differentiated from items within the identified scope. For example, items outside of the identified scope may have different text formatting than items within the identified scope.

In some embodiments, the hierarchical display may identify parent-child relationship between related items. For example, a child item may be indented from a parent item. Alternatively or additionally, a child item may be graphically connected to a parent item. For example, a conversation may be presented in a list pane of an e-mail application comprising a hierarchical display of aggregated e-mail messages. The hierarchical display may identify parent-child relationships between related messages and visually differentiate mail messages outside of the identified scope from e-mail messages within the identified scope.

In various implementations, an aggregate header for the group of aggregated items may be displayed. The aggregate header may indicate total items in the group and a status of items in the group within the identified scope. For example, an aggregate conversation header for a conversation may be displayed that indicate a total number of messages in the conversation and a number of unread e-mail messages in the conversation that are within the identified scope.

It can be appreciated that while the logic flow 500 may illustrate a certain sequence of steps, other sequences of steps may also be performed according to alternative embodiments. Moreover, some individual steps of the logic flow 500 may include multiple sub-steps that may be performed in various sequences as appropriate to the individual step. Furthermore, additional steps may be added or some steps may be removed depending on the particular implementation.

FIG. 6 illustrates a diagram an article of manufacture 600 suitable for storing logic for the various embodiments. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C#, C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving user input identifying a scope for item retrieval, wherein scope comprises one of: a local storage location for items, or a search query for retrieving one or more items, the items comprising at least one of: electronic mail messages and electronic mail message attachments;
   retrieving items according to the identified scope;
   associating items related to the retrieved items with the retrieved items, wherein when the scope is a local storage location the items related to the retrieved items include items that are stored in a different storage location, and when the scope is a search query, the items related to the retrieved items include items that do not meet the search query;
   aggregating items within the identified scope with related items outside of the identified scope;
   presenting a group of the aggregated items in a hierarchical display within a user interface; and
   displaying an aggregate header for the group of aggregated items, the aggregate header indicating all of the message authors and message senders, a total number of items in the group of aggregated items and a status of items in the group that are within the identified scope.

2. The method of claim 1, wherein items outside of the identified scope are visually differentiated from items within the identified scope.

3. The method of claim 2, wherein items outside of the identified scope have different text formatting than items within the identified scope.

4. The method of claim 1, wherein the hierarchical display identifies parent-child relationship between related items.

5. The method of claim 4, wherein a child item is indented from a parent item.

6. The method of claim 4, wherein a child item is graphically connected to a parent item.

7. The method of claim 1, wherein the group of aggregated items can be expanded and collapsed within the user interface.

8. The method of claim 1, wherein:
   when the scope comprises a local storage location,
   the group includes aggregated items from multiple storage locations including the local storage location and one or more additional storage locations.

9. The method of claim 1, wherein:
   when the scope comprises a search query for retrieving one or more items,
   the group includes items within the identified scope that satisfy the search query and items outside of the identified scope that are related to the items that satisfy the search query.

10. The method of claim 1, wherein a status of items includes at least one of: a read/unread status, a category, and a flag.

11. A computer-readable storage medium having computer-executable instructions stored thereon which, when executed by a computer, will cause the computer to:
   aggregate items in response to receiving an identified scope, the aggregated items comprising items within the identified scope and related items outside of the identified scope, wherein when the scope comprises a local storage location for items, the related items include items that are stored in a different storage location, and when the scope comprises a search query, the related items include items that do not meet the search query, the items comprising at least one of: electronic mail messages and electronic mail message attachments;
   present a group of the aggregated items in a hierarchical display within a user interface; and
   display an aggregate header for the group of aggregated items, the aggregate header indicating all of the message authors and message senders, a total number of items in the group of aggregated items and a status of items in the group that are within the identified scope.

12. The computer-readable medium of claim 11, further comprising computer-executable instructions stored thereon which, when executed by a computer, will cause the computer to aggregate items from multiple storage locations.

13. The computer-readable medium of claim 11, further comprising computer-executable instructions stored thereon which, when executed by a computer, will cause the computer to visually differentiate items outside of the identified scope from items within the identified scope.

14. The computer-readable medium of claim 11, further comprising computer-executable instructions stored thereon which, when executed by a computer, will cause the computer to identify parent-child relationship between related items.

15. The computer-readable medium of claim 11, wherein a status of items includes at least one of: a read/unread status, a category, and a flag.

16. A method, comprising:
receiving user input identifying a scope for retrieving electronic mail messages, wherein scope comprises one of: a local storage location for electronic mail messages, or a search query for retrieving one or more electronic mail messages;
presenting a user interface for an electronic mail application comprising a list pane displaying a list of electronic mail messages within the identified scope;
receiving user input selecting to arrange the listed electronic mail messages by conversation;
aggregating the electronic mail messages within the identified scope with at least one of: related electronic mail messages and related electronic mail message attachments that are outside of the identified scope, wherein when the scope is a local storage location the electronic mail messages and electronic mail message attachments related to the retrieved electronic mail messages include at least one message or attachment that is stored in a different storage location, and when the scope is a search query, the electronic mail messages and electronic mail message attachments related to the retrieved electronic mail messages include at least one message or attachment that does not meet the search query;
presenting a conversation in the list pane comprising a hierarchical display of the aggregated electronic mail messages, the hierarchical display identifying parent-child relationships between related electronic mail messages and visually differentiating electronic mail messages outside of the identified scope from electronic mail messages within the identified scope; and
displaying an aggregate conversation header for the conversation indicating all of the message authors and message senders, a total number of electronic mail messages in the conversation and a number of unread electronic mail messages in the conversation that are within the identified scope.

17. The method of claim 16, wherein:
when the identified scope comprises a selected folder within the user interface of the electronic mail application,
the conversation includes electronic mail messages within the identified scope that are stored in the selected folder and electronic mail messages outside of the identified scope that are stored in one or more additional folders of the electronic mail application.

18. The method of claim 16, wherein:
when the identified scope comprises a search query for retrieving electronic mail message within the electronic mail application,
the conversation includes electronic mail messages within the identified scope that satisfy the search query and electronic mail messages outside of the identified scope that are related to the electronic mail messages that satisfy the search query.

19. A computer-readable storage medium having computer-executable instructions causing a computer to perform the method of claim 16.

* * * * *